United States Patent [19]
Oh et al.

[11] Patent Number: 6,067,387
[45] Date of Patent: May 23, 2000

[54] ELECTRO-OPTIC POLYMER WAVEGUIDE DEVICE FOR DECREASING A DRIVING VOLTAGE AND AN OPTICAL LOSS AND METHOD OF MAKING THE SAME

[75] Inventors: Min Cheol Oh; Wol Yon Hwang; Seon Gyu Han, all of Daejeon, Rep. of Korea

[73] Assignees: Electronics and Telecommunications Research Institute, Daejeon; Korea Telecom, Seoul, both of Rep. of Korea

[21] Appl. No.: 09/119,650

[22] Filed: Jul. 21, 1998

[30] Foreign Application Priority Data

Dec. 22, 1997 [KR] Rep. of Korea ............. 97-71651

[51] Int. Cl.[7] ............. G02F 1/035; G02F 1/295; G02B 6/26
[52] U.S. Cl. ............. 385/2; 385/4; 385/43; 385/49; 385/8
[58] Field of Search ............. 385/2, 3, 4, 8, 385/9, 40, 43, 50

[56] References Cited

U.S. PATENT DOCUMENTS

| | | |
|---|---|---|
| 5,402,511 | 3/1995 | Malone et al. |
| 5,533,151 | 7/1996 | Leonard. |
| 5,594,824 | 1/1997 | Kerndimaier ............. 385/49 |
| 5,978,524 | 11/1999 | Bischel et al. ............. 385/4 |

*Primary Examiner*—Cassandra Spyrou
*Assistant Examiner*—Fayez Assaf
*Attorney, Agent, or Firm*—Antonelli, Terry, Stout & Kraus, LLP

[57] ABSTRACT

An electro-optic polymer waveguide device capable of decreasing a driving voltage and an optical loss is disclosed. A vertical tapered waveguide is formed between passive waveguides of input and output portions in a waveguide and an electro-optic modulating region, and an amplitude of a waveguide mode of the input and output portion waveguide is equal to that of a optical fiber, thereby minimizing a connection loss with the optical fiber.

7 Claims, 5 Drawing Sheets

ELECTRO-OPTIC POLYMER WAVEGUIDE DEVICE FOR DECREASING A DRIVING VOLTAGE AND AN OPTICAL LOSS AND METHOD OF MAKING THE SAME

BACKGROUND OF THE INVENTION

1. Field of the Invention

The present invention relates generally to an electro-optic polymer waveguide device capable of decreasing a driving voltage and an optical loss and a method of manufacturing such an electro-optic polymer waveguide device.

2. Description of Related Art

Since a waveguide device using a polymer can be applied to a variety of application field and be mass-produced of low price, it has been lively studied recently.

The polymer waveguide device can be divided into a passive type polymer and a nonlinear type polymer. The passive type polymer can be applied to an optical power distributor or a thermo-optic switch, including a device using thermo-optic effects.

L. Eldada et al. (IEEE J. Lightwave Technol., Vol. 14, No. 7, pp. 1704–1713, July 1996) has developed material capable of decreasing an optical propagation loss of a polymer waveguide under 0.1 dB/cm. Akzo company has produced and sold commercially a thermo-optic switch having a high stability and low driving voltage.

Study of the nonlinear type polymer has been progressed in a direction using electro-optic effects. Recently, W. H. Steier et al. has published an optical modulator having a band of modulation frequency over 100 GHz in a title "High bandwidth polymer modulators in Optoelectronic Integrated Circuits", Proc. SPIE 3006, pp. 314–317, 1997.

Mach-Zehnder modulator using the electro-optic polymer waveguide has an advantage of low velocity mismatch between a lightwave and a microwave, thereby easily making an optic device having a broad bandwidth of modulation.

In spite of such an advantage, since the electro-optic polymer waveguide device has not been still optimized completely in various characteristics, it is not enough as an practical application device.

The electro-optic polymer waveguide has advantage of allowing high-speed signal process over 100 GHz, but has the shortage of a large light-insertion loss and a large driving voltage, thereby having limitation in the practical application.

To reduce the driving voltage of the electro-optic waveguide device, it is required to decrease the thickness of the electro-optic waveguide device so as to minimize a distance between modulating electrode. For this, it is required to make a large difference of refractive index between a core layer and a cladding layer to limit waveguide light to the very thin core layer. Further, it is required to make a whole thickness of the waveguide enough thin by making the thicknesses of the upper and lower cladding layers very thin.

Since the driving voltage is applied between two electrodes sandwitching the waveguide, the thickness of the waveguide is thinner, the electric field is larger, whereby an efficiency of the optical modulation using the electro-optic effects is increase and the driving voltage of the device is lowered.

If the thickness of the waveguide is made thinnest, the driving voltage is minimized, but since an amplitude of waveguide light becomes too small as compared with that of the optical fiber mode, loss due to mode mismatch is too large during input and output between the optical fiber and the device. Moreover an allowable error at the time of aligning with the optical fiber is too small.

SUMMARY OF THE INVENTION

An object of the present invention is to provide an electro-optic polymer waveguide device capable of decreasing a driving voltage and an optical loss.

An another object of the present invention is to provide a method of manufacturing such an electro-optic polymer waveguide device.

To achieve the above object, the present invention discloses an electro-optic polymer waveguide device capable of decreasing a driving voltage and an optical loss, wherein a vertical tapered waveguide is formed between passive waveguides of input and output portions in a waveguide and an electro-optic modulating region, and wherein an amplitude of a waveguide mode of the input and output portion waveguide is equal to that of a optical fiber, thereby minimizing a connection loss with the optical fiber.

The waveguide of the electro-optic modulating region comprises a passive waveguide core layer, and an electro-optic modulating waveguide core layer buried in the passive waveguide core layer.

The electro-optic modulating region comprises a passive waveguide core layer, an electro-optic modulating waveguide core layer buried in the passive waveguide core layer, and upper and lower electrodes formed on and under the electro-optic modulating waveguide core layer.

The waveguide of the vertical tapered region comprises a passive waveguide core layer and an electro-optic modulating waveguide core layer buried in the passive waveguide core layer, the electro-optic modulating waveguide core layer having a vertically tapered edge in a direction of the waveguide in the input and output portion regions.

The waveguide in the input and output portion regions has a waveguide mode of waveguide identical with that of the optical fiber.

The waveguide mode of the electro-optic modulating waveguide is thinner than that of the waveguide mode of the input and output portion waveguide.

According to another aspect of the present invention, a method of manufacturing an electro-optic polymer waveguide device comprises the steps of forming a lower cladding layer of a passive waveguide and a first core layer on a substrate, forming a lower electrode which is deposited partially on a portion of the first core layer, forming a second core layer on the resultant structure, forming an electro-optic waveguide core layer on the second core layer to make a shape of a channel waveguide, etching an exposed portion using a mask pattern by RIE method, so that the electro-optic waveguide core layer and the second core layer are removed in a tapered shape, forming a third core layer, an upper electrode on the third core layer corresponding to the lower electrode, and a fourth core layer on the resultant structure, etching an exposed core layer using a mask pattern for an electro-optic waveguide region and a mask pattern for a waveguide by RIE method to complete the passive waveguide core layer, and forming an upper cladding layer of the passive waveguide on the resultant structure, thereby completing the electro-optic polymer waveguide device.

BRIEF DESCRIPTION OF THE DRAWINGS

Other features and objects of the present invention will be apparent from the following description in connection with the accompanying drawings.

DETAILED DESCRIPTION OF THE PREFERRED EMBODIMENTS

An electro-optic polymer waveguide device according to an embodiment of the present invention will now be described in detail with reference to the attached drawings.

This invention relates to the most important characteristic of an electro-optic polymer waveguide device, i.e., optimization of a driving voltage and a light-insertion loss.

Figure 1A:
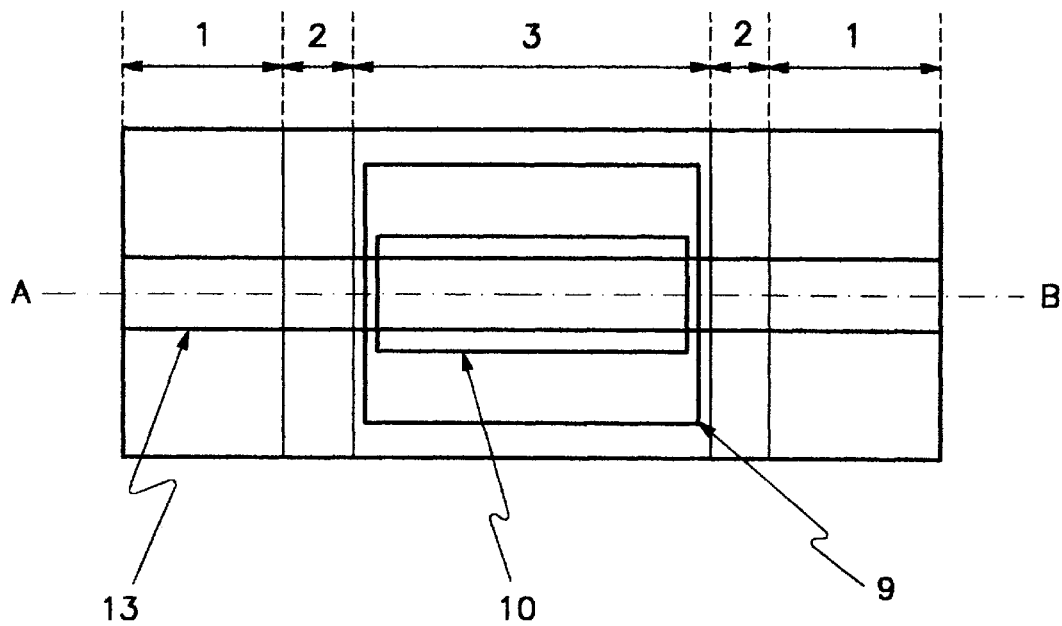
FIG. 1A is a plan view showing an electro-optic polymer phase modulating device according to an embodiment of the present invention.
Figure 1B:
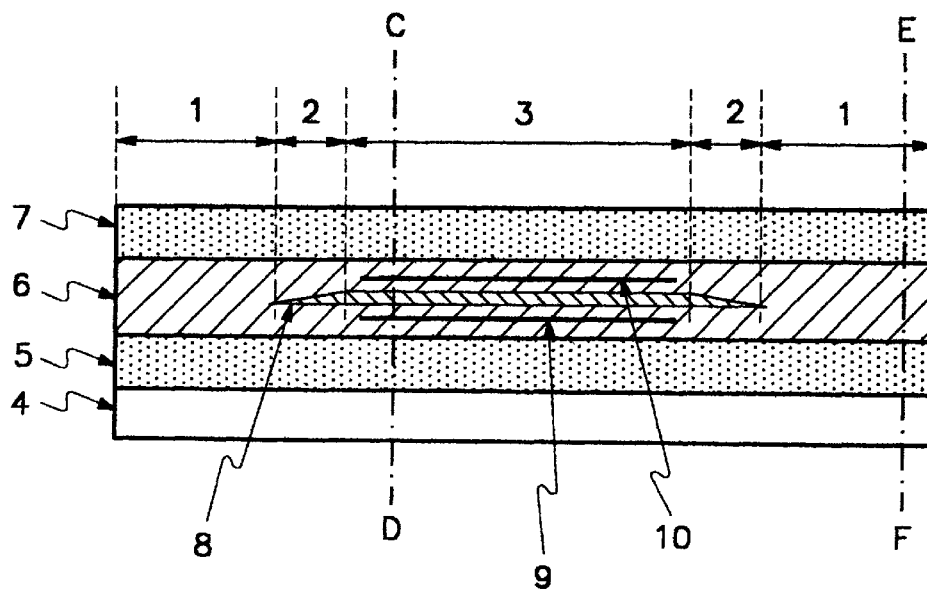
FIG. 1B is a sectional view taken along line A–B in FIG. 1A.

FIG. 1A is a plan view showing an electro-optic polymer waveguide device according to an embodiment of the present invention, and FIG. 1B is a sectional view taken along line A–B in FIG. 1A.

Referring to FIG. 1A, the waveguide device has a structure wherein an upper electrode 10 and a lower electrode 9 for electro-optic modulation are formed on and under a linear channel waveguide 13 proceeding in a certain direction, two passive type waveguide regions 1 and 1 are formed at input/output portions, two vertically tapered regions 2 and 2 of the waveguide 13 are formed adjacent to the passive type waveguide regions 1 and 1, and an electro-optic modulating waveguide region 3 interconnects the two vertically tapered regions 2 and 2.

Referring to FIG. 1B, each of the passive type waveguide regions 1 and 1 forming the input/output portions includes a lower cladding layer 5, a passive type waveguide core layer 6, and an upper cladding layer 7 formed on a substrate 4, and the electro-optic modulating waveguide region 3 for electro-optically modulating a phase of the waveguide light includes the lower cladding layer 5, the passive type waveguide core layer 6 in which an electro-optic waveguide core layer 8, upper and lower electrodes 10 and 9 are inserted, and the upper cladding layer 7 formed on the substrate 4 in order.

The passive waveguide regions 1 and 1 and the electro-optic modulating waveguide region 3 are interconnected by the two vertically tapered regions 2 and 2 in which thickness of the electro-optic waveguide core layer 8 inserted into the passive type waveguide core layer 6 are gradually varied.

In order to decrease the driving voltage of the device by maximizing the electro-optic effects, it is advantageous to make a distance between two electrodes 9 and 10 as narrow as possible.

If the distance between the electrodes 9 and 10 becomes narrow, a strength of electric field for the same driving voltage is increased, so that an amount of the electro-optic phase modulation is also increased. Therefore, it is necessary to make a vertical amplitude of the waveguide light passing the electro-optic waveguide very small.

Figure 2A:
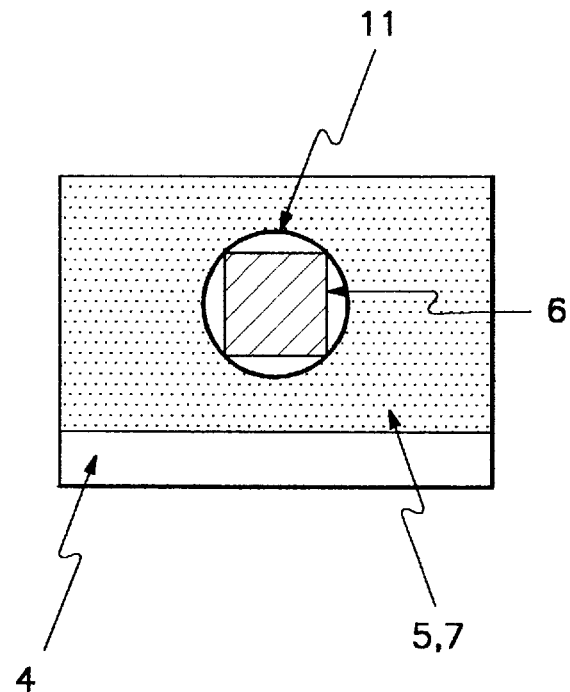
FIG. 2A is a sectional view showing input/output of the electro-optic polymer waveguide device, taken along line E–F in FIG. 1B.
Figure 2B:
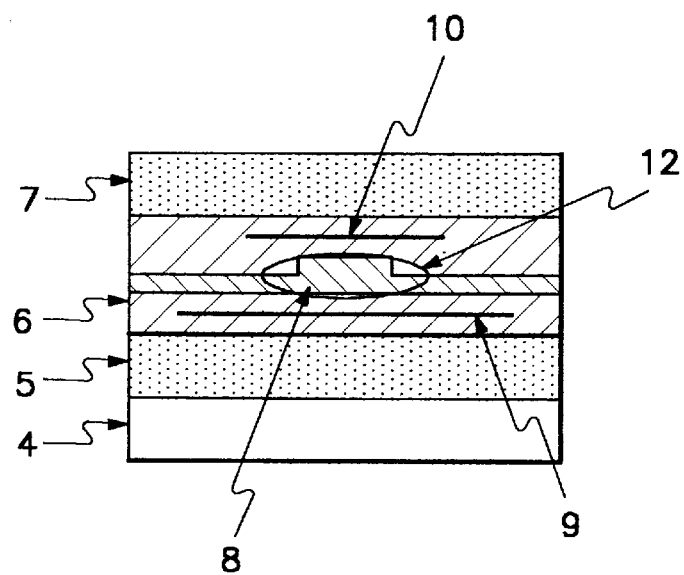
FIG. 2B is a sectional view showing the electro-optic modulating device, taken along line C–D in FIG. 1B.

FIG. 2A is a sectional view showing the passive waveguide regions 1 and 1, taken along line E–F in FIG. 1B and FIG. 2B is a sectional view showing the electro-optic modulating waveguide region 3, taken along line C–D in FIG. 1B in which waveguide modes 11 and 12 of the electro-optic waveguide and schematic amplitude of the waveguide light are shown. The amplitude of the waveguide mode 11 is equal to that of waveguide mode of an optical fiber approximately. A difference between refractive indexes of respective polymers comprising the electro-optic waveguide core layer 8 and the passive waveguide core layer 6 of the input/output portions is made very large over 0.02, and the thickness of the electro-optic waveguide core layer 8 is made thin to flatten the waveguide mode 12.

In the present invention, the distance between two electrodes 9 and 10 is made as narrow as possible and the efficiency of the electro-optic phase modulation is improved to decrease the driving voltage.

As mentioned above, in case of decreasing the driving voltage of the electro-optic waveguide device, it is advantageous to make the vertical amplitude of the waveguide mode 12 as small as possible. If the waveguide mode is small, however, mode mismatch loss due to the difference between mode amplitudes is increased during incidence of light by connecting the optical fiber from the outside.

Further, it is very difficult to correctly align and interconnect the optical fiber, thereby causing further optical loss. Therefore, to decrease the optical loss, a passive type waveguide is used as shown in FIG. 2A.

The passive type waveguide includes the passive type waveguide core layer 6, the upper cladding layer 5 and the lower cladding layer 7, and if the difference between the passive type waveguide core layer 6 and the upper/lower cladding layers 5 and 7 is about 0.003, the very large waveguide mode 11 is obtained.

In this case, if the difference of the refractive indexes and the thickness of the core layer are adjusted properly, the amplitude of the waveguide mode can be made as that similar to the waveguide mode of the optical fiber. Thus, when the light is incident by connecting the optical fiber to the proposed passive waveguide, the loss due to the mode mismatch is removed, and since the amplitude of the waveguide mode is very large, the allowable error becomes large in the alignment of the optical fiber.

As mentioned above, the waveguide having the large waveguide mode is necessary in the input/output portions to decrease the optical loss, while it is required that the mode of the electro-optic waveguide should be made small to decrease the driving voltage. Therefore, if directly connecting between them by using the electro-optic waveguide satisfying such contrary conditions, loss due to the mismatch of mode amplitude is generated largely.

Therefore, the mode mismatch loss is minimized by interconnecting the waveguides having different mode amplitude using the waveguide region 2 of the tapered structure as shown in FIG. 1. The amplitude of the waveguide mode of waveguide is changed gradually in the tapered region 2 of the waveguide, and if an angle of taper is enough small, further loss according to change in amplitude of the waveguide mode can be removed. Thus, the waveguide of the tapered region 2 functions to decrease the mode mismatch loss which may occur during passage of light between the waveguide of the passive waveguide region 1 and the electro-optic waveguide region 3.

FIGS. 3A to 3E show respective steps of the method of manufacturing an electro-optic polymer waveguide device according to an embodiment of the present invention.

Figure 3A:
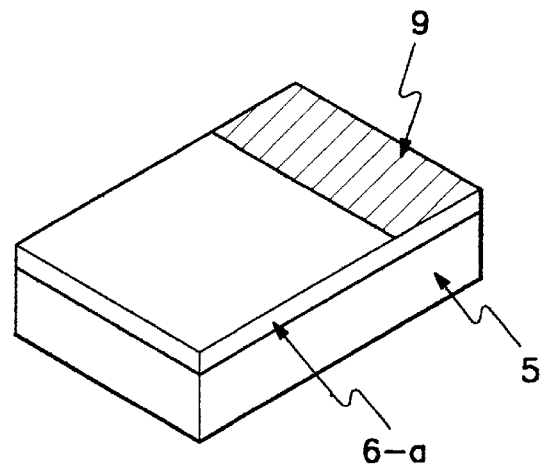
FIGS. 3A to 3F are sectional views showing respective steps of the method of manufacturing an electro-optic polymer waveguide device according to an embodiment of the present invention.

As shown in FIG. 3A, a lower cladding layer 5 of the passive waveguide is formed on a substrate (not shown), for example, silicon substrate, III–V family semiconductor (InP or GaAs) substrate, glass etc. Next, after coating polymer on the lower cladding layer 5 by spin coating method to form the passive waveguide core, a first core layer 6a is formed by applying ultraviolet rays or heats to the polymer film. Then, a lower electrode 9 is vacuum deposited partially on a portion in which the electro-optic polymer waveguide will be formed.

Figure 3B:
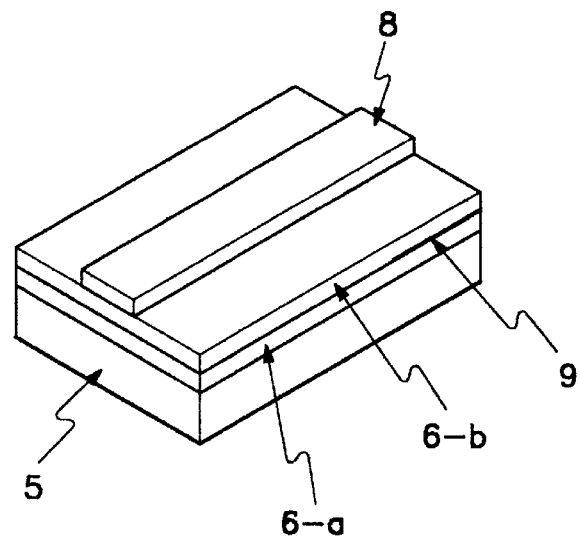

Subsequently, as shown in FIG. 3B, a polymer for the passive waveguide core layer and the electro-optic waveguide cladding layer is coated generally to form a second core layer 6b. Next, an electro-optic waveguide core layer 8 is coated on the second core layer 6b to make a shape of a channel waveguide by patterning by means of reactive ion etching (RIE) method.

Figure 3C:
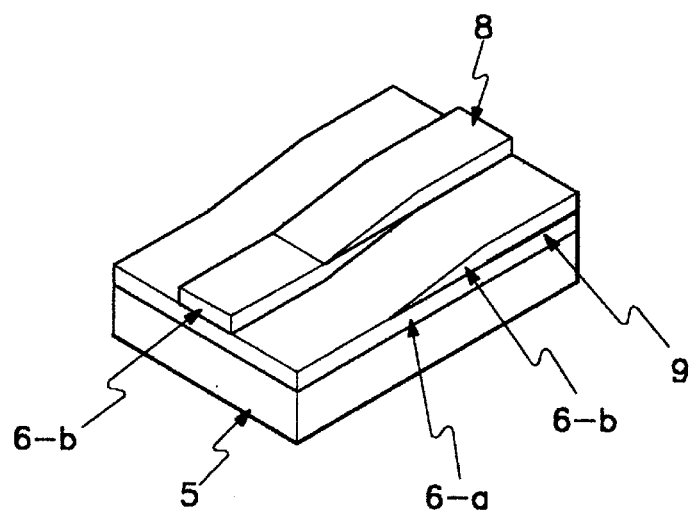

Then, as shown in FIG. 3C, a masking pattern (not shown) is formed on the electro-optic waveguide region 3 to etch an exposed portion by RIE method, so that electro-optic waveguide core layer 8 and the second core layer 6b are removed in a tapered shape.

Figure 3D:
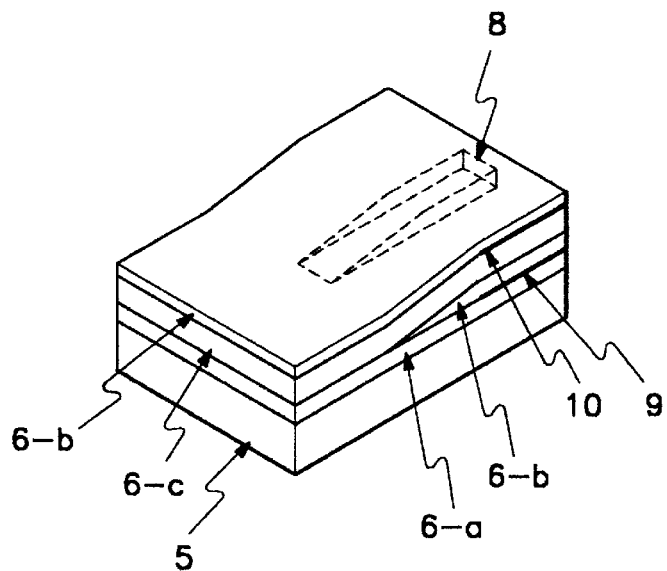

Next, as shown in FIG. 3D, a polymer is coated to form a third core layer 6c, and an upper electrode 10 is formed on the third core layer 6c corresponding to the lower electrode 9. Then, a polymer is deposited to a fourth core layer 6d.

The tapered structure and the electro-optic waveguide core 8 are formed to be buried into the passive waveguide core 6.

Figure 3E:
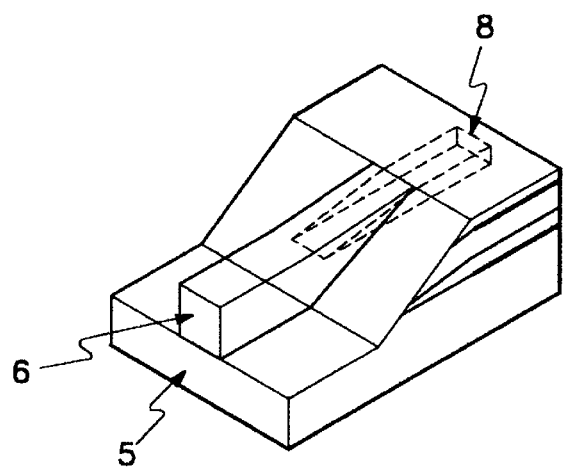

Next, as shown in FIG. 3E, a mask pattern (not shown) for the electro-optic waveguide region and a mask pattern (not shown) for the waveguide are formed on the fourth core layer 6d to etch an exposed core layer by RIE method, thereby completing the passive waveguide core layer 6.

Figure 3F:
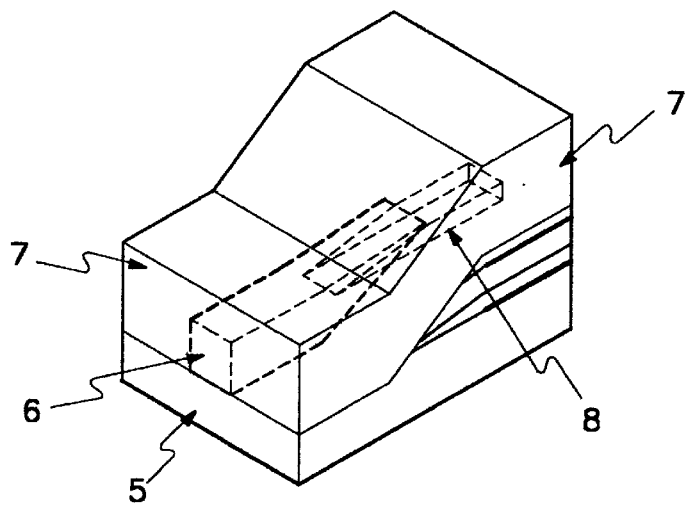

Finally, as shown in FIG. 3F, an upper cladding layer 7 of the passive waveguide is coated generally on the resultant structure, thereby completing the electro-optic polymer waveguide device.

Figure 4:
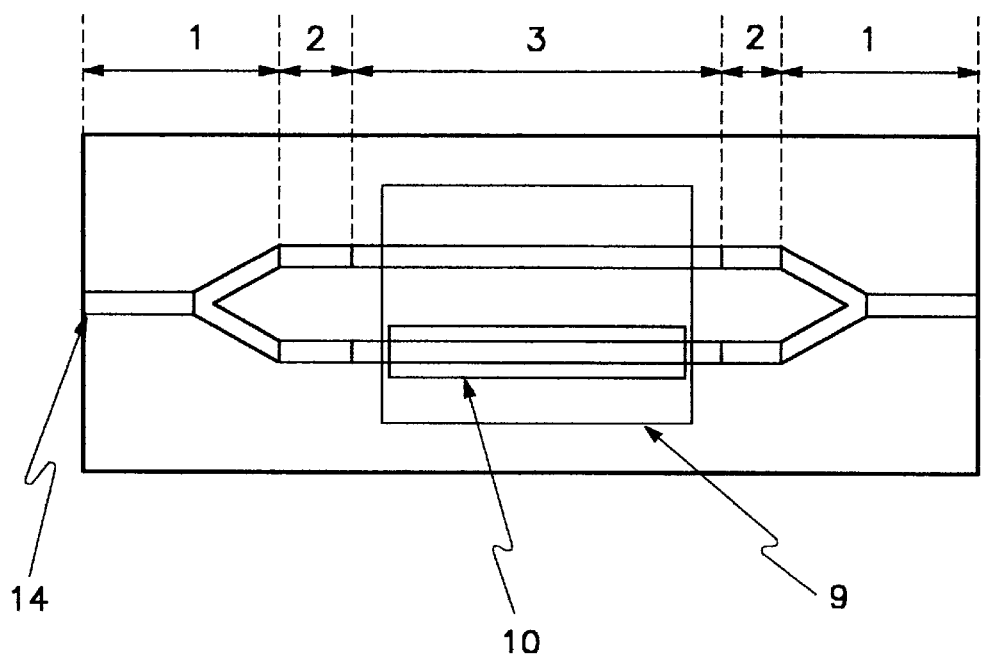
FIG. 4 is a schematic plan view of a Mach-Zehnder optical modulator manufactured according to the present invention.

FIG. 4 is a schematic plan view of a Mach-Zehnder optical modulator using the waveguide structure according to the manufacturing method as shown in FIGS. 3A to 3E.

The Mach-Zehnder optical modulator having the waveguide structure according to the present invention has a structure in which the Mach-Zehnder waveguide is formed to branch 1 line into two lines, upper electrode 10 is formed on only one branched line, and a structure of vertical tapered region 2 and the electro-optic modulator are inserted in only the indispensable portion, so that length of the electro-optic waveguide can be reduced, thereby decreasing an optical propagation loss. The reason is that generally, the electro-optic waveguide has large optical propagation loss than that of the passive waveguide.

Further, the waveguide circuit for generally processing an optical signal ia formed based on the passive waveguide using the above structure, and the electro-optic waveguide is formed partially in only the portion necessary for electro-optic signal processing, thereby decreasing whole optical loss.

If length of the electro-optic modulating region is 2 cm, propagation loss is 2 dB/cm, the resultant loss of the Mach-Zehnder optical modulator is only 4 dB. Therefore, since the mode mismatch loss becomes small to an ignorable extent, a total insertion loss is 5–6 dB by even adding further losses.

The driving voltage of the electro-optic modulator is defined as a voltage $V\pi$ necessary for changing a phase of lightwave by 180°. The driving voltage $V\pi$ is expressed by a following equation $$V_\pi = \frac{\lambda d}{n^3 r_{33} L} \quad (1)$$

wherein $\lambda$ is a wavelength of lightwave, d is a distance between upper and lower electrodes, n is an effective refractive index of waveguide, r33 is an electro-optic coefficient, and L is a length of electrode.

If d=5 μm, L=2 cm, r33=20 pm/V, n=1.8, and λ=1.3 μm, the driving voltage $V\pi$ becomes 2.8 V. To lower this value, it is required to make the waveguide mode of the electro-optic waveguide smaller so as to decrease the distance between the electrodes. If the distance lessens 3 μm, the modulation voltage decreases in 1.7 V.

As mentioned above, the polymer device has an advantage of conforming to very high optical signal processing and if maximizing the efficiency using the present structure, the present invention can be applicable to a verity of application field.

Further, since the present invention can be mass produced with low price using the polymer, it is applicable to a verity of optical signal processing system, for example, optical communication, optical exchange, and optical sensor.

Although the invention has been described with reference to particular embodiments, the description is only an example of the invention's application and should not be taken as a limitation. Various adaptation and combinations of features of the embodiments disclosed are within the scope of the invention as defined by the following claims.

What is claimed is:

1. An electro-optic polymer waveguide device which decreases a driving voltage and an optical loss, wherein a vertical tapered waveguide region is formed between passive input and output portions in a waveguide and an electro-optic modulating region, and wherein an amplitude of a waveguide mode of the input and output portions is equal to that of a coupled optical fiber, thereby minimizing a connection loss with the optical fiber.

2. An electro-optic polymer waveguide device according to claim 1, wherein said waveguide of the electro-optic modulating region comprises:

a passive waveguide core layer; and an electro-optic modulating waveguide core layer buried in the passive waveguide core layer.

3. An electro-optic polymer waveguide device according to claim 1, wherein said electro-optic modulating region comprises:

a passive waveguide core layer;

an electro-optic modulating waveguide core layer buried in the passive waveguide core layer; and upper and lower electrodes formed on and under the electro-optic modulating waveguide core layer.

4. An electro-optic polymer waveguide device according to claim 1, wherein said waveguide of the vertical tapered region comprises:

a passive waveguide core layer; and an electro-optic modulating waveguide core layer buried in the passive waveguide core layer, said electro-optic modulating waveguide core layer having a vertically tapered edge in a direction of the waveguide in the input and output portion regions.

5. An electro-optic polymer waveguide device according to claim 1, wherein said waveguide in the input and output portion regions has a waveguide mode of waveguide identical with that of the optical fiber.

6. An electro-optic polymer waveguide device according to claim 1, wherein said waveguide mode of the electro-optic modulating waveguide is thinner than that of the waveguide mode of the input and output portion waveguide.

7. A method of manufacturing an electro-optic polymer waveguide device comprising the steps of:

forming a lower cladding layer of a passive waveguide and a first core layer on a substrate;

forming a lower electrode which is deposited partially on a portion of the first core layer;

forming a second core layer on said layers and said electrode;

forming an electro-optic waveguide core layer on the second core layer to make a shape of a channel waveguide;

etching an exposed portion using a mask pattern by reactive ion etching RIE method, so that the electro-optic waveguide core layer and the second core layer are removed in a tapered shape;

forming a third core layer, an upper electrode on the third core layer corresponding to the lower electrode, and a fourth core layer on the resultant structure;

etching an exposed core layer using a mask pattern for an electro-optic waveguide region and a mask pattern for a waveguide by RIE method to complete the passive waveguide core layer; and forming an upper cladding layer of the passive waveguide on the resultant structure, thereby completing the electro-optic polymer waveguide device.

* * * * *